Nov. 4, 1947.                    E. H. ENSINGER                    2,430,282
                                 PORTABLE CONVEYOR
                               Filed April 17, 1944              2 Sheets-Sheet 1
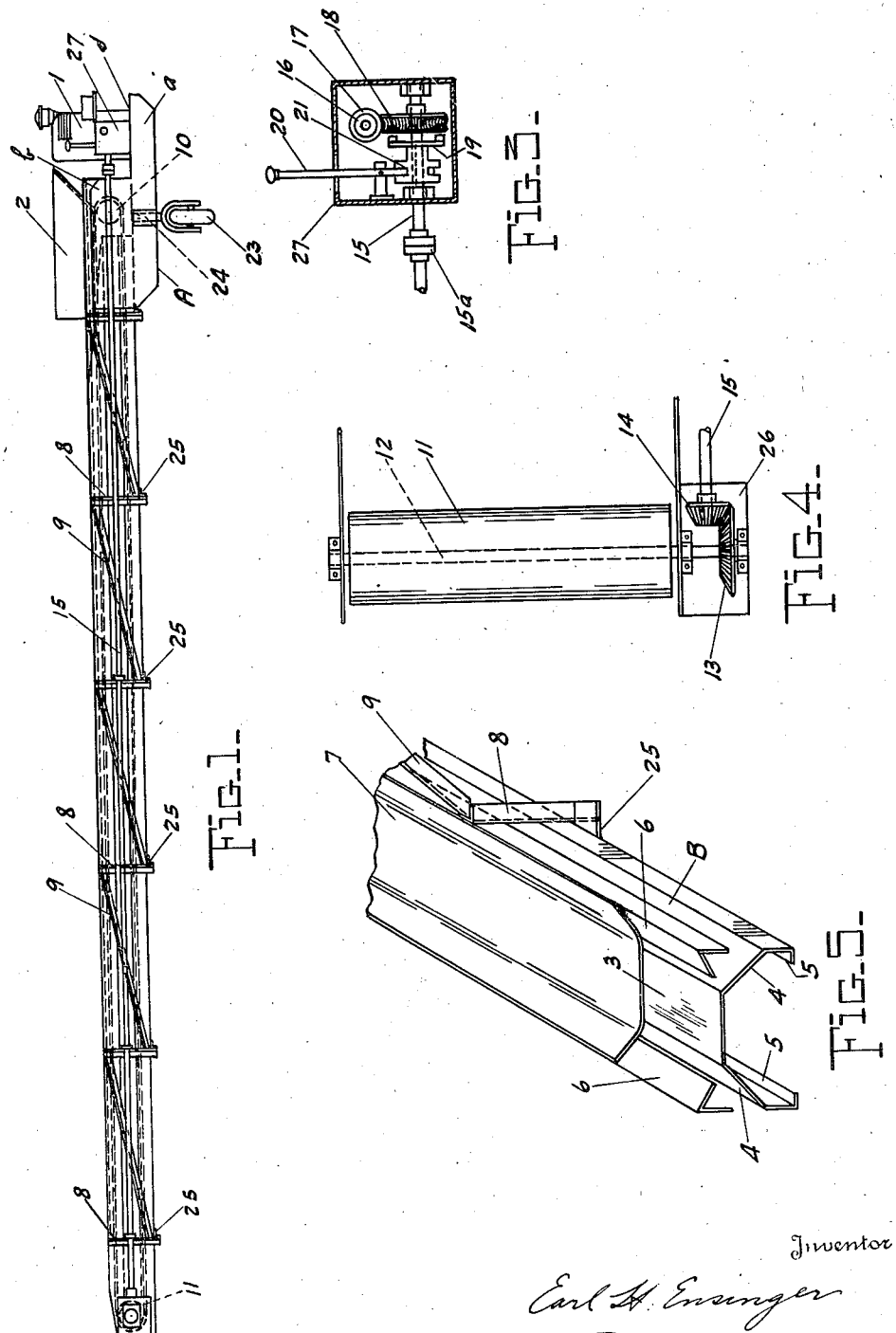
Inventor
Earl H. Ensinger
By Robert Robb
Attorneys Nov. 4, 1947.  E. H. ENSINGER  2,430,282
PORTABLE CONVEYOR
Filed April 17, 1944   2 Sheets-Sheet 2
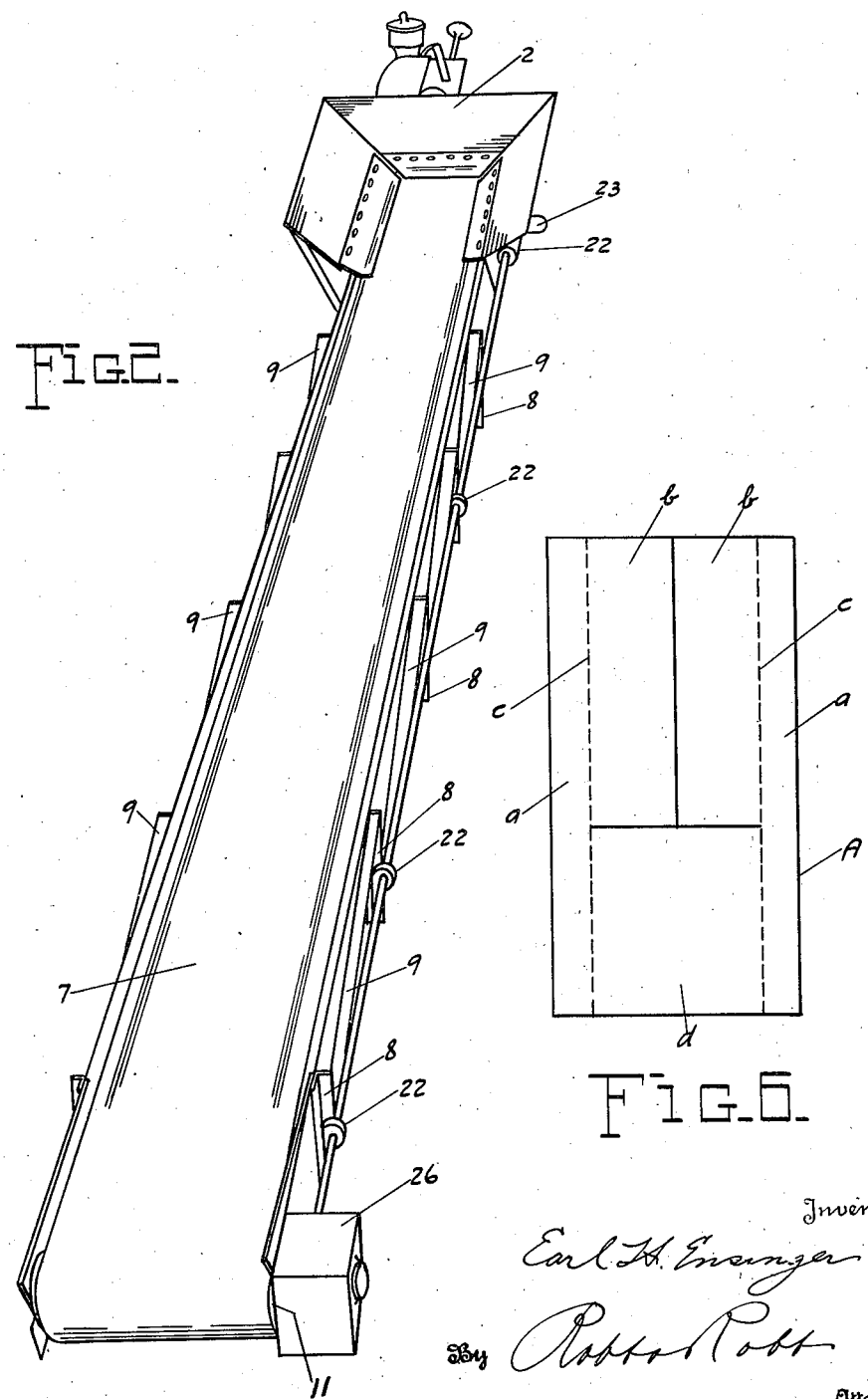

Patented Nov. 4, 1947

2,430,282

UNITED STATES PATENT OFFICE 2,430,282

PORTABLE CONVEYOR

Earl H. Ensinger, Cleveland, Ohio

Application April 17, 1944, Serial No. 531,435

3 Claims. (Cl. 198—57)

The present invention pertains to the art of portable conveyors, particularly of the light simple type designed for conveying by means of a belt unit, coal, concrete, stone, or the like for short distances.

The conveyor of the invention is especially adapted, because of its light, simple construction, and ease of manipulation or movement, to be carried by a coal truck for the purpose of facilitating the movement or conveying of coal from the truck to the window of a dwelling or other place where the coal or other similar material is to be deposited.

The primary object of the invention has been to design a belt type conveyor of the class referred to, the construction of which is made up very largely of stock metal parts such as channel plates, angle irons, round stock for shafting or tubing, and the like. The novel construction designed by me involves primarily the employment of a peculiar form of longitudinal frame which is made up of a channel member adapted to carry the load of the coal or other material which is deposited upon the belt, the latter traveling longitudinally of the channel member from end to end thereof.

My invention further involves a special provision in the form of novel guide means for the belt disposed spacedly above the channel frame member and facilitating the bellying of the belt at its longitudinal central portion so that it may assume a trough like condition as the material deposited thereon is conveyed from the hopper end of the conveyor to its delivery end.

Other detail novel features of the invention will become apparent more fully upon reference to the following description in conjunction with the annexed drawings, in which—

Figure 1 is a side elevation of a conveyor made in accordance with the general construction of my invention.

Figure 2 is a perspective view of the conveyor looking toward its delivery end with the hopper end more remote from the line of vision.

Figure 3 is a sectional view of the clutch and worm gear drive casing showing more clearly the simplified clutch operating means for transmitting the power of the engine carried by the hopper end of the conveyor to the belt of the conveyor.

Figure 4 is a fragmentary top plan and sectional view showing the driving connection between the drive shaft and the outer or delivery end roller of the conveyor, the belt omitted.

Figure 5 is a perspective view partially broken away bringing out more clearly the manner of constructing the channel frame of the conveyor, the relative disposition thereon of the belt guide members, and the arrangement of the belt operating upon the latter as when the belt has been troughed by means of the weight of the material deposited thereon.

Figure 6 is a plan view of the metal blank which is used for making the wheeled hopper and motor supporting frame located at the hopper end of the main belt frame of the machine.

Referring particularly to Figures 1 and 2 of the drawings, it will be seen that my conveying machine is made up of a hopper and motor supporting wheeled frame generally designated at A, together with a belt supporting frame generally designated at B. The frame A is preferably made from a sheet of flat sheet metal generally of the configuration shown in Figure 6 previous to being bent to provide the frame construction as seen in Figure 1. By folding the longitudinal edge portion $a$ of the body sheet of metal downwardly, spaced side members are provided, as seen in Figure 1, and by folding the portion $b$ of the sheet of metal upwardly, the hopper supporting members $b$ will be obtained. The parts $b$ fold upwardly on the same fold line $c$ used for the lines of the downward folding of the portions $a$ by which side flanges are obtained for the hopper and motor supporting frame unit. With the portions $a$ folded downwardly, and the portions $b$ folded upwardly, there will be left a horizontal flat portion designated $d$ on which the engine 1, see Figure 1, is carried. The hopper 2 into which the material flows from the truck or any other source is mounted directly upon the upwardly extending members $b$, which when folded upwardly form vertical support flanges to which the hopper may be readily welded or otherwise secured.

Extending from the base between and welded to the portion $c$ of the hopper and motor supporting frame is the belt frame B previously referred to. Said belt frame B is received for a short extent of its inner end portion between the members $b$ of the frame A, and, being rigidly secured thereto, provide substantial and strong offstanding frame extensions from the hopper 2 of the machine.

It is notable, by reference especially to Figure 5 that the belt frame is of somewhat inverted U-form, and therefore of channel shape to provide a self-supporting beam structure. It comprises the belt supporting upper flat portion 3, the downwardly inclining side portions 4, and the inwardly turned strengthening flanges 5.

Spaced above the downwardly and outwardly inclining portions 4 of the channel frame B are the belt supporting and guiding members 6. These guiding members 6 are of somewhat V-angle form, the angle of the V inverted, and the inner portions of the member 6 form inclined spaced guide means for the opposite edge portions of the flexible endless belt 7 providing the conveyor means cooperating with the channel frame B and the guide and supporting members 6 to convey the materials from the hopper 2 to the delivery end of the frame B.

The supporting and guide members 6 for the belt 7 are carried by vertical angle plates 8 which are welded at their lower ends to opposite sides of the channel member B and welded at their upper ends to the opposite outer sides of the vertical portions of the spacing and guide members 6. To rigidify the supporting mounting of the members 6 on the frame B, the supporting angle plates 8 are reinforced by diagonal angle plates 9 which extend from the lower portion of the angle plates 8 to the upper portion of the next adjacent angle plates 8. The diagonal angle plates 9 are welded at their opposite ends to angle plates 8 in a self-evident manner, and provide ample strength for supporting the members 6 in their upper spaced relation to the upper side of the channel frame B.

It will be apparent by reason of the peculiar disposition of the supporting and guide members 6 beneath the belt 7 that the latter will be able to assume a trough-like condition when the materials conveyed thereby are deposited thereon at the hopper 2 and caused to move outwardly to the delivery end of the frame B by operation of the motor 1.

The belt 7 may be of any suitable material and passes at its inner end around a suitable roller 10 and at its outer end around a second roller 11. The roller 11 at the delivery end of the channel frame B is the driven roller for the belt 7 and therefore the effect of the driving of the roller 11 is to pull the upper lap of the belt 7 which carries the material conveyed outwardly to the delivery end of the conveyor.

Reference is made to Figures 3 and 4 to show the simple mechanism employed for the driving of the outer roller 11. To this end the roller 11 has a supporting shaft 12 equipped with a bevel gear 13 and driven in turn by a bevel pinion 14 on a longitudinal driving shaft 15 which extends from the outer end of the conveyor to the inner hopper end to a point adjacent to the engine 1. The engine shaft 16 is equipped with a worm 17 which engages a worm wheel 18 loosely mounted upon the driving shaft 15. During the operation of the engine 1 the worm wheel 18 will be constantly driven. For driving the shaft 15 the worm wheel 18 is adapted to be connected to said shaft 15 by means of a splined clutch member 19 mounted on the shaft 15 and having clutch pins or members to engage in clutch recesses in the inner side of the wheel 18. A suitable lever 20 is connected to the clutch member 19 by a suitable throw ring or collar 21 to shift the clutch member 19 into and out of engagement with the wheel 18 thereby to cause driving of the shaft 15 or discontinue its operation, at the same time of course correspondingly driving or discontinuing the movement of the belt 7. If desired, the shaft 15 may be made in two sections connected by a flexible coupling 15a, seen in Figure 3. The shaft 15 is supported in bearings 22 carried at one side of the conveyor unit and preferably welded to certain of the upstanding angle plates 8 at such side.

I provide suitable supporting rollers or wheels 23 for supporting the motor and hopper end of the conveyor for movement to shift the conveyor readily after it has been deposited upon the ground and is desired to be put into use. The wheels or rollers 23 are preferably of the caster roller type and are swivelled at their upper end at 24 in tubular bearings secured to the inner sides of the parts a of the hopper and motor frame A.

As a means for further rigidifying the conveyor frame B and the supporting members 6, it is contemplated that horizontal angle bars or plates 25 shall extend across the channel frame member B at its underside at intervals and shall be welded or otherwise united to the lower ends of the vertical angle parts 8 previously described, and to the lower ends of the diagonal bracing members 9 also previously referred to.

In view of the foregoing description, it will be apparent that I have designed an exceedingly simplified construction of conveyor, one in which the main frame of the conveyor is a strong channel-like member capable of supporting the load of material which is to be conveyed by the belt from the hopper end of said frame to the delivery end thereof. The use of this type of channel frame member does away largely with the necessity for providing a separate frame and belt supporting structure, one in which the belt supporting means is separate from the frame structure itself so far as the load sustaining action of the belt supporting means is concerned.

It will also be apparent that by reason of my simplified construction, I can make my machine very cheaply and therefore render its use more universal than would otherwise be the case.

The gears 13 and 14 are mounted in a small gear box 26, see Figure 4, and the clutch and drive gearing previously described as shown in Figure 3, is mounted also in a suitable gear box 27.

By reason of the spaced disposition of the inner flanges of the supporting and guiding members 6 in relation to the sloping sides 4 of the channel member B, if any of the conveyed material such as coal dust, coal parts, or concrete aggregate material passes between the side edges of the belt and said members 6 it will freely escape from beneath the belt by passing through the spaces between the members 6 and said sloping sides 4 of the channel member B. By reason of this advantageous construction it will be evident that none of the conveyed material is likely to become caught in any choked position beneath the belt so as to give rise to attrition action which would cause wearing of the edges or underside of the belt unduly.

Having thus described my invention, what I claim as new and desire to secure by Letters Patent of the United States, is:

1. An endless belt conveyor comprising a hopper and motor frame, a self supporting belt supporting frame extending from said first frame at one end and comprising a channel member of approximately inverted U-form having a horizontal middle portion and outwardly and downwardly sloping sides formed with inwardly extending longitudinal flanges, belt supporting and guide members spaced upwardly from the channel member frame, a belt movable longitudinally on and above the middle portion of the channel member, supports extending between the last frame and said supporting and guide members, diagonal bracing plates connected each to a lower end of one support and the upper end of a next adjacent support, the supporting and guide members being of inverted V-form with their inner flanges beneath the side edges of the belt and sloping toward the horizontal middle portion of the channel frame member and spaced therefrom to permit conveyed material passing between the belt edges and sloping sides of the channel member to escape laterally from the last member, the outer flanges of the V-form guiding members being attached directly to the supports previously mentioned, a hopper and motor mounted on the hopper and motor frame, and a driving connection from the motor to said belt.

2. An endless belt conveyor comprising a self-supporting belt supporting frame including a channel member of approximately inverted U-form having a horizontal middle portion and outwardly and downwardly sloping sides provided at their lower edges with lateral flanges, belt supporting and guide members spaced upwardly from the channel member frame and having portions thereof sloping oppositely to the slope of the downwardly sloping sides of the channel member, a belt movable longitudinally on and above the middle portion of the channel member, supports extending between the channel member and said supporting and guide members, a hopper at one end of the belt supporting frame, and a hopper frame made of a plate having its longitudinal edge portions bent down to provide rigid flanges, said plate being formed with a longitudinal central cut extending from one end and portions of the plate on opposite sides of the cut being bent upwardly to provide supporting members, means uniting the said upwardly bent portions of the hopper frame to the hopper, and means uniting the hopper frame to the channel member of the conveyor frame at the sides of the latter.

3. An endless belt conveyor comprising a hopper, a self-supporting belt supporting frame attached to and extending from said hopper at one end and comprising a channel member of approximately inverted U-form having a horizontal middle portion from opposite longitudinal portions of which the sides of the chanel member slope downwardly and outwardly, thence downwardly and vertically, the lower edges of the last mentioned vertically extending portions having lateral flanges, the channel member thus constituting an integral self-supporting beam or frame for the conveyor, belt supporting and guide members attached to the channel member at opposite sides of the latter and spaced from the downwardly sloping side portions aforesaid, said guide members including parts sloping oppositely to the sloping side portions of the channel member, belt rollers at opposite ends of the channel member, an endless belt passing around said rollers with the longitudinal middle portion of its upper lap adapted to rest and move on the horizontal middle portion of the channel member and the edges of said upper lap resting on the said supporting and guiding members, and its lower lap movable beneath the channel member, and driving means for the belt carried by the supporting frame.

EARL H. ENSINGER.

REFERENCES CITED

The following references are of record in the file of this patent:

UNITED STATES PATENTS

| Number | Name | Date |
|---|---|---|
| 1,355,308 | Brown | Oct. 12, 1920 |
| 1,381,009 | Pratt | June 7, 1921 |
| 1,520,332 | Connolly | Dec. 23, 1924 |
| 1,649,604 | Lillbridge | Nov. 15, 1927 |
| 1,850,891 | Nyborg | Mar. 22, 1932 |
| 2,139,834 | Levin | Dec. 13, 1938 |

FOREIGN PATENTS

| Number | Country | Date |
|---|---|---|
| 257,072 | Great Britain | Aug. 26, 1926 |
| 826,874 | France | Jan. 12, 1938 |